United States Patent
Nishi

(10) Patent No.: US 10,939,725 B2
(45) Date of Patent: Mar. 9, 2021

(54) SHOE-FORMING MEMBER AND SHOE

(71) Applicant: ASICS Corporation, Kobe (JP)

(72) Inventor: Toshiaki Nishi, Kobe (JP)

(73) Assignee: ASICS CORPORATION

( * ) Notice: Subject to any disclaimer, the term of this patent is extended or adjusted under 35 U.S.C. 154(b) by 0 days.

(21) Appl. No.: 16/582,168

(22) Filed: Sep. 25, 2019

(65) Prior Publication Data

US 2020/0015546 A1 Jan. 16, 2020

Related U.S. Application Data

(63) Continuation of application No. 15/506,360, filed as application No. PCT/JP2015/074458 on Aug. 28, 2015, now abandoned, which is a continuation of application No. PCT/JP2014/072724, filed on Aug. 29, 2014.

(51) Int. Cl.
| | | |
|---|---|---|
| *C08L 25/16* | (2006.01) | |
| *A43B 13/12* | (2006.01) | |
| *A43B 13/04* | (2006.01) | |
| *C08L 23/12* | (2006.01) | |
| *C08L 9/06* | (2006.01) | |

(52) U.S. Cl.
CPC ............. *A43B 13/12* (2013.01); *A43B 13/04* (2013.01); *C08L 9/06* (2013.01); *C08L 23/12* (2013.01); *C08L 25/16* (2013.01)

(58) Field of Classification Search
CPC ......... A43B 13/04; A43B 13/12; C08L 23/12; C08L 9/06; C08L 25/16
See application file for complete search history.

(56) References Cited

U.S. PATENT DOCUMENTS

| | | | | |
|---|---|---|---|---|
| 3,981,851 | A | * | 9/1976 | Plueddemann ........ C08K 5/544 524/243 |
| 6,884,843 | B2 | * | 4/2005 | Kauffman et al. ........ B32B 7/12 525/55 |
| 2007/0264514 | A1 | * | 11/2007 | Prigandt et al. .... B29C 45/1676 428/494 |
| 2008/0229622 | A1 | | 9/2008 | Mori et al. |
| 2010/0154253 | A1 | | 6/2010 | Imazato et al. |
| 2011/0265351 | A1 | | 11/2011 | Mori et al. |
| 2014/0141187 | A1 | * | 5/2014 | Siddhamalli et al. .. C08L 23/12 428/36.9 |

FOREIGN PATENT DOCUMENTS

| | | |
|---|---|---|
| EP | 2143353 A1 | 1/2010 |
| EP | 2955203 A1 | 12/2015 |
| JP | 11-228784 A | 8/1999 |
| JP | 2000-034389 A | 2/2000 |
| JP | 2002-317096 A | 10/2002 |
| JP | 2002-317097 A | 10/2002 |
| JP | 2006-192723 A | 7/2006 |
| WO | 2006/121069 | 11/2006 |
| WO | 2008/146342 A1 | 12/2008 |

OTHER PUBLICATIONS

Extended European Search Report for European Patent Application No. 15 83 6864 dated Mar. 26, 2018.
International Search Report and Written Opinion dated Nov. 17, 2015, from the corresponding PCT/P2015/074458.
International Preliminary Report on Patentability and the English translation thereof for International Application No. PCT/JP2015/074458 dated Mar. 9, 2017.

* cited by examiner

*Primary Examiner* — Nathan M Nutter
(74) *Attorney, Agent, or Firm* — Katten Muchin Rosenman LLP

(57) ABSTRACT

Provided is a shoe-forming member that has excellent adhesion. The shoe-forming member is formed using a thermoplastic elastomer containing an aromatic polymer having a poly-α-methylstyrene structure in a matrix together with a polypropylene resin.

6 Claims, 1 Drawing Sheet

SHOE-FORMING MEMBER AND SHOE

This application is a continuation of U.S. patent application Ser. No. 15/506,360 filed Feb. 24, 2017, which is a 371 of international PCT/JP2015/074458, filed Aug. 28, 2015 which is a continuation of international PCT/JP2014/072724, filed Aug. 29, 2014 the contents of all incorporated herein by reference.

FIELD

The present invention relates to a shoe-forming member and a shoe, more specifically, to a shoe-forming member containing a thermoplastic elastomer and a shoe including such a shoe-forming member.

BACKGROUND

Conventionally, upper materials and sole materials of sports shoes or the like are mostly formed using crosslinked rubber. Forming the shoe-forming members such as upper materials and sole materials using thermoplastic elastomers has been studied in view of recyclability and formability (see Patent Literature 1 below).

CITATION LIST

Patent Literature

Patent Literature 1: JP 2006-192723 A

SUMMARY

Technical Problem

Urethane thermoplastic elastomers and olefin thermoplastic elastomers are known as such thermoplastic elastomers. Olefin thermoplastic elastomers in which domains composed of crosslinked elastomers are dispersed in a matrix of a polypropylene resin have excellent hydrolysis resistance as compared with urethane thermoplastic elastomers. Further, the aforementioned olefin thermoplastic elastomers are suitable as materials of shoe-forming members since they have a comparatively low density and less chances of embrittlement at low temperature. On the other hand, the olefin thermoplastic elastomers are less likely to exert high adhesiveness with common adhesives. Therefore, even when members made of olefin thermoplastic elastomers are used for forming a shoe, the portions in which they can be used may possibly be limited.

The present invention aims to solve such a problem, and an object thereof is to improve the adhesiveness of a shoe-forming member containing an olefin thermoplastic elastomer.

Solution to Problem

In order to solve the aforementioned problem, a shoe-forming member according to the present invention contains a thermoplastic elastomer, the thermoplastic elastomer containing: a matrix including a polypropylene resin and an aromatic polymer; and a domain containing a crosslinked elastomer, wherein the aromatic polymer has a poly-α-methylstyrene structure in at least part of its molecule.

Further, in order to solve the aforementioned problem, a shoe according to the present invention includes the aforementioned shoe-forming member.

Advantageous Effects of Invention

The thermoplastic elastomer contained in the shoe-forming member of the present invention contains an aromatic polymer having a poly-α-methylstyrene structure together with a polypropylene resin in a matrix in at least part of its molecule. The shoe-forming member can exert excellent adhesiveness by containing the specific aromatic polymer together with the polypropylene resin in the matrix of the thermoplastic elastomer.

DESCRIPTION OF EMBODIMENTS

Figure 1:
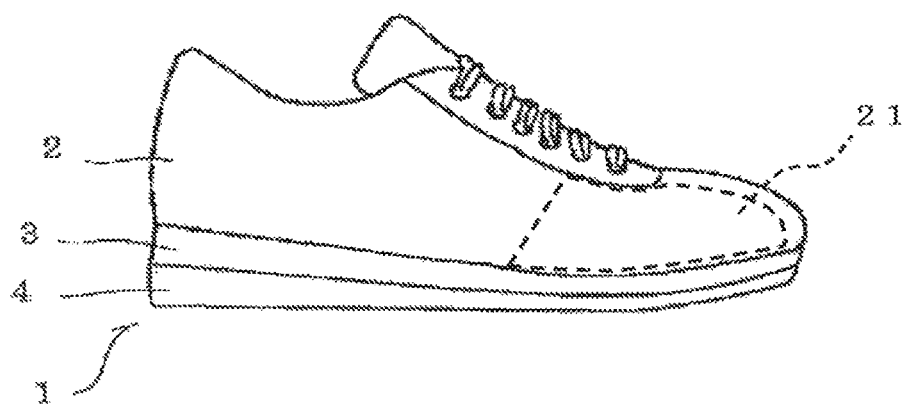
FIG. 1 is a schematic view showing an aspect of a shoe using a shoe-forming member according to an embodiment.

Hereinafter, a shoe-forming member of the present invention will be described by way of the embodiments. FIG. 1 shows a shoe including a shoe-forming member of this embodiment. A shoe 1 has an upper material 2 and shoe sole members 3 and 4. The shoe 1 has a midsole 3 and an outer sole 4 as the shoe sole members. The upper material 2 of the shoe 1 has a layer structure including at least one piece of reinforcing sheet material 21. Specifically, the shoe-forming member of this embodiment is preferably the reinforcing sheet material 21, the outer sole 4, or the like.

First, a thermoplastic elastomer that is suitable for forming the reinforcing sheet material 21 and the outer sole 4 will be described. The thermoplastic elastomer is a polyolefin thermoplastic elastomer, more specifically, a polypropylene thermoplastic elastomer. The thermoplastic elastomer has a microphase-separated structure formed by a matrix containing a polypropylene resin and an aromatic polymer, and a domain composed of a crosslinked elastomer.

The polypropylene resin may be any one of a homopolypropylene resin that is a propylene homopolymer, a random polypropylene resin that is a random copolymer of propylene and ethylene, and a block polypropylene resin that is a block copolymer of propylene and ethylene.

The aromatic polymer constituting the matrix together with the polypropylene resin may be a homopolymer resin (homopolymer) of α-methylstyrene monomer, or a copolymer resin (copolymer) composed of two or more types of monomers, as long as it has a poly-α-methylstyrene structure in at least part of its molecule.

In the case where the aromatic polymer is a homopolymer, specific examples of the α-methylstyrene monomer as a constituent unit thereof include α-methylstyrene, α-methyl-o-methylstyrene, α-methyl-m-methylstyrene, α-methyl-p-methylstyrene, α-methyl-2,6-dimethylstyrene, α-methyl-2,4-dimethylstyrene, and α-methyl-2,4,6-trimethylstyrene. That is, specific examples of the homopolymer include poly-α-methylstyrene resin, poly-α-methyl-o-methylstyrene resin, poly-α-methyl-m-methylstyrene resin, poly-α-methyl-p-methylstyrene resin, poly-α-methyl-2,6-dimethylstyrene resin, poly-α-methyl-2,4-dimethylstyrene resin, and poly-α-methyl-2,4,6-trimethylstyrene resin.

In the case where the aromatic polymer is a copolymer resin, specific examples thereof include a copolymer resin of two or more types of the α-methylstyrene monomer. Further, in the case where the aromatic polymer is a copolymer resin, specific examples thereof include a copolymer resin of a vinyl monomer that is copolymerizable with the α-methylstyrene monomer and one or more types of the α-methylstyrene monomer. In the case of such a copolymer resin, the aromatic polymer may be a block copolymer resin or a graft copolymer resin.

Examples of the vinyl monomer that is copolymerizable with the α-methylstyrene monomer include olefin monomers, acrylic monomers, styrene monomers, vinyl ether monomers, and diene monomers.

Specific examples of the olefin monomers include ethylene, propylene, 1-butene, 2-methyl-1-butene, 3-methyl-1-butene, pentene, hexene, cyclohexene, 4-methyl-1-pentene, vinyl cyclohexane, octene, and norbornene.

Specific examples of the acrylic monomers include (meth)acrylic acid, methyl (meth)acrylate, ethyl (meth)acrylate, propyl (meth)acrylate, isopropyl (meth)acrylate, butyl (meth)acrylate, pentyl (meth)acrylate, hexyl (meth)acrylate, octyl (meth)acrylate, ethylhexyl (meth)acrylate, dodecyl (meth)acrylate, myristyl (meth)acrylate, palmityl (meth)acrylate, stearyl (meth)acrylate, behenyl (meth)acrylate, cyclohexyl (meth)acrylate, and phenyl (meth)acrylate.

Specific examples of the styrene monomers include styrene, 4-methylstyrene, 4-ethyl styrene, 4-propyl styrene, 4-t-butyl styrene, 4-cyclohexyl styrene, 4-dodecyl styrene, 2-ethyl-4-benzyl styrene, 4-(phenyl butyl) styrene, 2,4,6-trimethylstyrene, monochlorostyrene, dichloro styrene, monobromostyrene, dibromostyrene, and methoxystyrene.

Specific examples of the vinyl ether monomers include methyl vinyl ether, ethyl vinyl ether, n-propyl vinyl ether, isopropyl vinyl ether, n-butyl vinyl ether, sec-butyl vinyl ether, tert-butyl vinyl ether, isobutyl vinyl ether, methyl propenyl ether, and ethyl propenyl ether.

Specific examples of the diene monomers include butadiene, isoprene, hexadiene, cyclopentadiene, cyclohexadiene, dicyclopentadiene, divinyl benzene, and ethylidene norbornene.

These vinyl monomers may have a functional group such as a hydroxyl group and an amino group.

The aromatic polymer constituting the matrix together with the polypropylene resin in this embodiment is preferably such a homopolymer as mentioned above, preferably poly-α-methylstyrene resin.

The ratio of the polypropylene resin and the aromatic polymer in the thermoplastic elastomer is not specifically limited, but it is preferable that the aromatic polymer be contained in the thermoplastic elastomer at a mass ratio equal to or higher than the ratio of the polypropylene resin, for allowing the reinforcing sheet material 21 and the outer sole 4 to exert excellent adhesiveness and excellent abrasion resistance. Specifically, the aromatic polymer is preferably contained in the thermoplastic elastomer at a mass ratio of 1.5 times or more of the polypropylene resin, more preferably 7.5 times or more thereof. Further, the aromatic polymer is preferably contained in the thermoplastic elastomer at a mass ratio of 20 times or less of the polypropylene resin.

The crosslinked elastomer constituting the domain in the thermoplastic elastomer is not specifically limited, but styrene elastomers are preferable in view of the affinity or the like with the matrix. That is, the crosslinked elastomer constituting the domain is preferably a crosslinked elastomer obtained by crosslinking a styrene polymer such as styrene-ethylene-butylene copolymer resin (SEB), styrene-butadiene-styrene copolymer resin (SBS), a hydrogenated product of SBS (styrene-ethylene-butylene-styrene copolymer resin (SEBS)), styrene-isoprene-styrene copolymer resin (SIS), a hydrogenated product of SIS (styrene-ethylene-propylene-styrene copolymer resin (SEPS)), styrene-isobutylene-styrene copolymer resin (SIBS), styrene-butadiene-isoprene-styrene copolymer resin (SBIS), a hydrogenated product of SBIS (styrene-ethylene-ethylene/propylene-styrene copolymer resin (SEEPS)), styrene-butadiene-styrene-butadiene copolymer resin (SBSB), and styrene-butadiene-styrene-butadiene-styrene copolymer resin (SBSBS), using a crosslinking agent. Among these, the domain is preferably a crosslinked elastomer obtained by crosslinking SEBS or SEEPS, particularly preferably a crosslinked elastomer obtained by crosslinking SEEPS, for allowing the thermoplastic elastomer to exert excellent abrasion resistance.

In view of the dispersibility of the domain in the matrix, it is preferable that the domain be formed by supplying such a styrene polymer as mentioned above to a kneading machine such as an extruder together with the polypropylene resin and the aromatic polymer, to allow the styrene polymer to be dynamically crosslinked in the kneading machine.

When producing a thermoplastic elastomer by performing the dynamic crosslinking in a kneading machine, it is not necessary to supply the styrene polymer, the polypropylene resin, and the aromatic polymer to the kneading machine all at once, and after a primary kneaded mixture is obtained by first kneading of the styrene polymer, the polypropylene resin, and a part of the aromatic polymer using the kneading machine, second kneading may be performed by adding the rest to the primary kneaded mixture. As a method for producing the thermoplastic elastomer, it is preferable to employ a method of adding the polypropylene resin and a part or all of the aromatic polymer afterwards to the kneading machine, in which after a primary kneaded mixture having a higher content of the styrene polymer than the thermoplastic elastomer to be produced is produced in the presence of the crosslinking agent, and thereafter a part or all of the constituents of the matrix are added to the primary kneaded mixture for second kneading. According to such a preferable embodiment, the styrene polymer and the crosslinking agent can be allowed to exist in the primary kneaded mixture at high concentration, and thus the crosslinking efficiency of the styrene polymer can be improved.

The aromatic polymer in this embodiment is incompatible with the polypropylene resin. The incompatibility between the aromatic polymer and the polypropylene resin can be confirmed, for example, by producing a melt kneaded product containing them at a mass ratio of 1:1 and checking the presence of a phase separation structure in the melt kneaded product.

The thermoplastic elastomer of this embodiment has a specific morphology. Specifically, such domains of the thermoplastic elastomer in this embodiment are dispersed in the matrix while being covered by the polypropylene resin. Here, the phrase "domains being covered by the polypropylene resin" does not have a restrictive meaning such that "all the domains are covered by the polypropylene resin". That is, the phrase "domains being covered by the polypropylene resin" has a meaning that includes the case where "some of the domains are covered by the polypropylene resin". Further, the phrase "domains being covered by the polypropylene resin" does not have a restrictive meaning such that "the polypropylene resin covers the entire surfaces of the domains". That is, the phrase "domains being covered by the polypropylene resin" has a meaning that includes the case where "the polypropylene resin partially covers the surfaces of the domains".

The polypropylene resin of this embodiment has a low melt viscosity as compared with the aromatic polymer and thus is effective for achieving excellent formability of the thermoplastic elastomer. That is, in the thermoplastic elastomer when it is heated, the polypropylene resin that has melted and thus has low viscosity is present around the domains, and therefore the polypropylene resin exhibits a function as a lubricant in plastic deformation. The melt viscosity of the polypropylene resin and the aromatic polymer can be measured using a twin bore capillary rheometer (barrel diameter: 15 mm) having a die (die diameter: 1 mm, die length: 16 mm) attached to one end and an orifice having a diameter of 1 mm on the other end, for example, under conditions of a temperature of 230° C. and a shear speed of 50 (l/).

Figure 2:
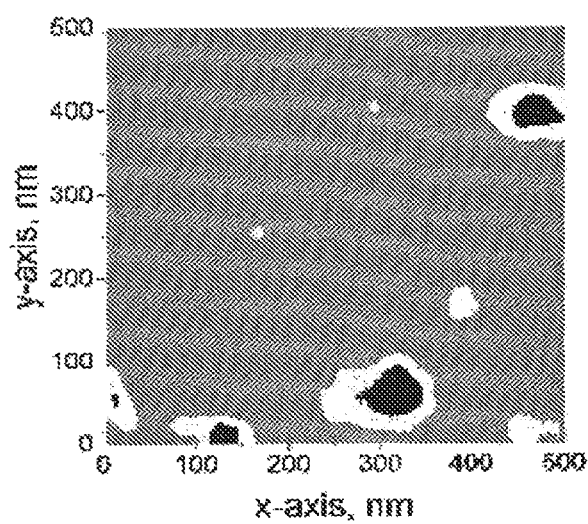
FIG. 2 is an image showing a microstructure of a thermoplastic elastomer used for forming a shoe sole member (observation results using an atomic force microscope).

For exhibiting the aforementioned function more significantly, it is preferable that some of the domains be entirely covered by the polypropylene resin. Whether the thermoplastic elastomer has such a morphology can be confirmed, for example, using an atomic force microscope. This will be explained with reference to FIG. 2. FIG. 2 shows the observation results of the thermoplastic elastomer according to this embodiment using an atomic force microscope, in which white portions are the polypropylene resin, and black portions surrounded by the polypropylene resin are the crosslinked styrene elastomer. Further, the other portions in FIG. 2 are mainly portions occupied by the aromatic polymer. Such dispersion of the domains of the thermoplastic elastomer in the matrix while being covered by the polypropylene resin can be confirmed using an atomic force microscope.

The content of the crosslinked styrene elastomer serving as the domains in the thermoplastic elastomer is preferably 15 mass % or more and 50 mass % or less, for allowing the reinforcing sheet material 21 and the outer sole 4 to exert excellent flexibility and excellent strength.

Specific examples of the crosslinking agent used for crosslinking the styrene polymer to give a crosslinked elastomer include organic peroxides. Specific examples of the organic peroxides include 1,1-bis(1,1-dimethylethylperoxy)cyclohexane, 1,1-bis(1,1-dimethylbutylperoxy)cyclohexane, 4,4-bis [(t-butyl)peroxy]butyl pentanoate, dicumyl peroxide, t-butyl α-cumyl peroxide, 2,5-dimethyl-2,5-bis(t-butylperoxy)hexane, 2,5-bis(t-butylperoxy)-2,5-dimethyl-3-hexin, dibenzoyl peroxide, bis(4-methylbenzoyl) peroxide, 2,5-dimethyl-2,5-di (benzoylperoxy)hexane, t-butyl peroxybenzoate, and t-hexyl peroxybenzoate.

In the case where the styrene polymer is crosslinked using the crosslinking agent, the amount of the crosslinking agent to be used can be generally 1 part by mass or more and 10 parts by mass or less with respect to 100 parts by mass of the styrene polymer.

For obtaining the crosslinked elastomer by crosslinking the styrene polymer, a crosslinking aid may be used in combination with the aforementioned crosslinking agent. The crosslinking aid preferably has at least one of an acryloyl group and a methacryloyl group, preferably a plurality of them. Among these, a compound represented by formula (1) below is suitable as a crosslinking aid used in combination with the crosslinking agent for crosslinking the styrene polymer:

$$X^1\text{-}A^1\text{-}R^1\text{-}A^2\text{-}X^2 \quad (1)$$

where "$R^1$" represents an alkylene having a chain length of 2 to 10 carbon atoms or a substituted alkylene in which a hydrogen atom of the alkylene is substituted with a substituent, "$A^1$" and "$A^2$" each independently represent a direct bond or an ether bond, and "$X^1$" and "$X^2$" each independently represent an acryloyl group or a methacryloyl group.

In formula (1) above, "$R^1$" preferably has a structure represented by formula (2) below:

where "$R^2$" and "$R^3$" represent a hydrogen atom, a hydroxyl group, an alkyl group having 2 to 3 carbon atoms, a (meth)acryloyloxy group, a (meth)acryloyloxymethyl group, or a (meth)acryloyloxyethyl group.

In the compound represented by formula (1) above, it is preferable that both "$A^1$" and "$A^2$" be ether bonds, either "$X^1$" or "$X^2$" be an acryloyl group, and the other be a methacryloyl group. Further, in formula (2) above, it is particularly preferable that either "$R^2$" or "$R^3$" be a hydrogen atom, and the other be a hydroxyl group.

That is, it is particularly preferable that the crosslinking aid be 2-hydroxy-3-acryloyloxypropyl methacrylate represented by formula (3) below:

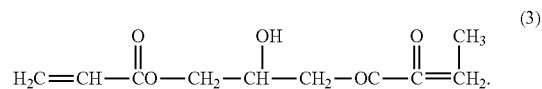

Further, in the compound represented by formula (1) above, it is preferable that both "$A^1$" and "$A^2$" be ether bonds, and both "$X^1$" and "$X^2$" be methacryloyl groups, and in formula (2), it is preferable that either "$R^2$" or "$R^3$" above be an ethyl group, and the other be a methacryloyloxy methyl group. That is, preferable examples of the crosslinking aid also can include trimethylolpropanetrimethacrylate represented by formula (4) below:

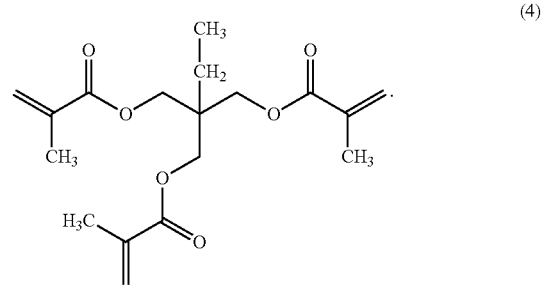 [SMILES: C=C(C)C(=O)OCC(CC)(COC(=O)C(=C)C)COC(=O)C(=C)C]

Use of such a preferable crosslinking aid as mentioned above allows the thermoplastic elastomer to exert excellent abrasion resistance, so that the thermoplastic elastomer can be a material suitable for the shoe-forming member. In the case of using the crosslinking aid together with the crosslinking agent for crosslinking the styrene polymer, the higher the amount of the crosslinking aid used, the more the abrasion resistance is improved. Accordingly, in general, the content of the crosslinking aid is preferably 1 part by mass or more, more preferably 5 parts by mass or more, particularly preferably 10 parts by mass or more, with respect to 100 parts by mass of the styrene polymer. More specifically, when crosslinking the styrene polymer, the content of the crosslinking aid is preferably 0.03 mol or more, more preferably 0.05 mol or more, with respect to 100 parts by mass of the styrene polymer. The crosslinking aid does not need to be contained in an excessive amount, and the upper limit thereof is generally about 100 parts by mass with respect to 100 parts by mass of the styrene polymer, and is about 1 mol with respect to 100 parts by mass of the styrene polymer.

The thermoplastic elastomer may further contain additives other than above, and examples of the additives include a hardness modifier such as paraffin oil, a tackifier such as terpene resin, an anti-aging agent, a processing aid, an inorganic filler, a silane coupling agent, an antibacterial agent, a perfume, and a pigment.

Among these, paraffin oil is a component effective for adjusting the texture of the thermoplastic elastomer corresponding to the purpose. In the case where the thermoplastic elastomer contains paraffin oil, the ratio of the paraffin oil is preferably 10 parts by mass or more and 50 parts by mass or less, with respect to 100 parts by mass of the total of the polypropylene resin, the aromatic polymer, and the crosslinked elastomer.

Since the fluidity of the polypropylene resin and the aromatic polymer constituting the matrix is exerted by heating, the thermoplastic elastomer can be easily shaped to a desired shape by various molding methods such as injection molding, transfer molding, and press molding. That is, the thermoplastic elastomer is suitable as a forming material for forming the reinforcing sheet material 21 and the outer sole 4 using such a molding method as mentioned above. Moreover, the thermoplastic elastomer has excellent adhesiveness. Accordingly, in the case where the reinforcing sheet material 21 is formed using the thermoplastic elastomer, the need to employ a special bonding method, for example, for forming the upper material 2 by bonding the reinforcing sheet material 21 to another sheet can be eliminated. Further, in the case where the outer sole 4 is formed using the thermoplastic elastomer, the need to employ a special bonding method, for example, for bonding the outer sole 4 to the midsole 3 can be eliminated.

As described above, a shoe-forming member using the thermoplastic elastomer of this embodiment has not only excellent recyclability but also an effect of facilitating the production of shoes. The shoe-forming member of the present invention may be formed using only the thermoplastic elastomer as mentioned above or may be formed using other materials such as fabrics and non-woven fabrics in combination. Further, the shoe-forming member of the present invention may be formed by foaming the aforementioned thermoplastic elastomer using a foaming agent or the like.

The thermoplastic elastomer of this embodiment also has excellent abrasion resistance. Accordingly, in the case where the thermoplastic elastomer is contained only partially in the shoe-forming member, the thermoplastic elastomer is preferably contained in exposed portions on the outer surface and the inner surface of the shoe for allowing the shoe-forming member to exert the effect on the abrasion resistance. Further, conventionally known technical matter relating to shoe-forming members can be employed also for the shoe-forming member of the present invention, as long as the effects of the present invention are not significantly impaired.

EXAMPLES

Next, the present invention will be described further in detail by way of examples. However, the present invention is not limited to these examples.
<Evaluation 1: Abrasion Resistance and Peel Strength>
(Production of Thermoplastic Elastomer)

The following materials (a) to (e) were supplied to a twin screw extruder so as to be kneaded in the twin screw extruder, so that the kneaded mixture was dynamically crosslinked, and a dry blended mixture of the kneaded mixture and material (f) was supplied to an injection molding machine, to produce a test piece in the injection molding machine.

(a) Styrene polymer (SEEPS): 100 parts by mass
(b) Paraffin oil (P-200): 100 parts by mass
(c) Crosslinking agent (organic peroxide (2,5-dimethyl-2,5-bis(t-butylperoxy)hexane)): 2 parts by mass
(d) Crosslinking aid (2-hydroxy-3-acryloyloxypropyl methacrylate): 10 parts by mass
(e) Polypropylene resin (homo-PP): 20 parts by mass
(f) Poly-α-methylstyrene resin: 30 to 380 parts by mass
(Evaluation Method)

The thus obtained test piece made of thermoplastic elastomer was evaluated based on the following criteria.
1) Hardness: JIS K6301:1975 Spring hardness tester, Type A, Instantaneous
2) Density: JIS K7112:1999 Method for measuring density and specific gravity of plastic-non-foamed plastic, Underwater displacement (23° C.)
3) Tensile strength: JIS K6301:1975 Dumbbell No. 2, "Tensile strength at break"
4) Elongation: JIS K6301: 1975 Dumbbell No. 2, "Elongation at break"
5) Tear strength: JIS K6301: 1975 Type B
6) DIN abrasion: JIS K6264-2: 2005 (Method B, Temperature: 23° C., Applied force to test piece: 10 N, Wear distance: 40 m)
7) Peel strength (adhesiveness): JIS K 6854-2 (T-type peeling method, Rigid adherend: Test piece made of thermoplastic elastomer (coated with primer), Adherend: Urethane flat plate; rigid adherend and adherend were adhered together using urethane adhesive, Test temperature: 20±3° C., Distance between chucks: 20 mm, Tensile speed: 0.00083-0.00004 m/s).

A primer generally used for olefin materials (such as a primer containing chlorinated polypropylene) was used.

These evaluation results on the content of poly-α-methylstyrene resin in the thermoplastic elastomer were summarized as follows.

TABLE 1

| | Content (parts by mass) | | Hardness | Density | Tensile strength | Elongation | Tear strength | DIN abrasion | Peel strength |
|---|---|---|---|---|---|---|---|---|---|
| | (a) to (e) | (f) | JIS-A | g/cm$^3$ | MPa | % | kgf/cm | mm$^3$ | kgf/2 cm |
| No. 1-1 | (a): 100 | 30 | 51 | 0.90 | 8.0 | 1011 | 29.9 | 143.9 | 2.5 |
| No. 1-2 | (b): 100 | 80 | 53 | 0.90 | 7.9 | 878 | 34.8 | 115.0 | 4.1 |
| No. 1-3 | (c): 2 | 180 | 55 | 0.91 | 9.9 | 820 | 36.4 | 111.4 | 4.5 |

TABLE 1-continued

| | Content (parts by mass) | | Hardness | Density | Tensile strength | Elongation | Tear strength | DIN abrasion | Peel strength |
|---|---|---|---|---|---|---|---|---|---|
| | (a) to (e) | (f) | JIS-A | g/cm³ | MPa | % | kgf/cm | mm³ | kgf/2 cm |
| No. 1-4 | (d): 10 | 180 | 57 | 0.91 | 12.5 | 769 | 42.2 | 87.6 | 5.5 |
| No. 1-5 | (e): 20 | 280 | 60 | 0.91 | 17.3 | 708 | 39.9 | 98.6 | 6.9 |
| No. 1-6 | | 380 | 62 | 0.91 | 19.9 | 673 | 36.8 | 106.3 | 7.2 |

It is understood from the above results that the thermoplastic elastomer has excellent adhesiveness and excellent abrasion resistance by containing 150 parts by mass or more of poly-o-methylstyrene resin (f) (7.5 times or more with respect to polypropylene resin (e)).

<Evaluation 2: Abrasion Resistance and Peel Strength>

Using the following three types (a1) to (a3) of styrene polymer (a) and the following five types (d1) to (d5) of crosslinking aid (d), relative comparison of abrasion resistance was conducted.

a) Styrene polymer
   (a1) SEEPS
   (a2) SEBS
   (a3) SBS d) Crosslinking aid
   (d1) 2-hydroxy-3-acryloyloxypropyl methacrylate
   (d2) Trimethylolpropanetrimethacrylate
   (d3) Ethylene glycol dimethacrylate
   (d4) Triallyl isocyanurate (TAIC)
   (d5) Polyethylene glycol (#600) diacrylate (Evaluation Method)

A test piece was produced in the same manner as in "Evaluation 1" above except that the content of crosslinking aid (d) in the raw materials for forming the thermoplastic elastomer was adjusted to 0.1 mol/kg or 0.06, and the content of poly-α-methylstyrene resin (f) with respect to 100 parts by mass of the styrene polymer (a) was adjusted to 280 parts by mass, and an evaluation was conducted in the same manner as in "Evaluation 1". The evaluation results are shown below.

TABLE 2

| | Content (parts by mass) | | | Hardness | Density | Tensile strength | Elongation | Tear strength | DIN abrasion | Peel strength |
|---|---|---|---|---|---|---|---|---|---|---|
| | (a) to (e) | (c) | (d) | JIS-A | g/cm³ | MPa | % | kgf/cm | mm³ | kgf/2 cm |
| No. 2-0 | (a1): 100 | 0 | 0 | — | 0.90 | — | — | — | 132.1 | — |
| No. 2-1 | (b): 100 | 2 | (d1): 10 | 60 | 0.91 | 17.3 | 708 | 39.9 | 98.6 | 6.9 |
| No. 2-2 | (e): 20 | 2 | (d2): 20 | 60 | 0.91 | 16.0 | 762 | 39.3 | 94.5 | 5.2 |
| No. 2-3 | (f): 280 | 2 | (d3): 10 | 58 | 0.91 | 14.6 | 762 | 40.4 | 109.5 | 6.0 |
| No. 2-4 | | 2 | (d4): 25 | — | 0.92 | — | — | — | 135.1 | — |
| No. 2-5 | | 2 | (d5): 40 | — | 0.92 | — | — | — | 138.3 | — |

* The content of materials (d1) to (d5) in the total compounding agents was adjusted to 0.1 mol/kg.

TABLE 3

| | Content (parts by mass) | | | Density | DIN abrasion |
|---|---|---|---|---|---|
| | (a) to (e) | (c) | (d) | g/cm³ | mm³ |
| No. 3-0 | (a2): 100 | 0 | 0 | 0.91 | 126.8 |
| No. 3-1 | (b): 100 | 2 | (d1): 6 | 0.91 | 123.3 |
| No. 3-2 | (e): 20 | 2 | (d2): 10 | 0.91 | 117.0 |
| No. 3-3 | (f): 280 | 2 | (d4): 12 | 0.92 | 145.7 |

*The content of materials (d1), (d2) and (d4) in the total compounding agents was adjusted to 0.06 mol/kg.

TABLE 4

| | Content (parts by mass) | | | Density | DIN abrasion |
|---|---|---|---|---|---|
| | (a) to (e) | (c) | (d) | g/cm³ | mm³ |
| No. 4-0 | (a3): 100 | 0 | 0 | 0.92 | 125.6 |
| No. 4-1 | (b): 100 | 2 | (d1): 6 | 0.92 | 157.8 |
| No. 4-2 | (e): 20 | 2 | (d2): 10 | 0.92 | 172.3 |
| No. 4-3 | (f): 280 | 2 | (d4): 12 | 0.93 | 232.6 |

*The content of materials (d1), (d2) and (d4) in the total compounding agents was adjusted to 0.06 mol/kg.

From the above results, it can be seen that a crosslinked elastomer obtained by crosslinking SEEPS (a1) is particularly preferable in the types of styrene polymer as the domain of the thermoplastic elastomer. Further, the aforementioned evaluation results show that even a polyolefin thermoplastic elastomer exerts excellent adhesiveness and excellent abrasion resistance by containing an aromatic polymer having a poly-α-methylstyrene structure in its matrix.

<Evaluation 3 (Reference Evaluation): Content of Crosslinking Aid>

(Evaluation Method)

A test piece without containing poly-α-methylstyrene resin (f) was produced by changing the content of polypropylene resin (e) in the raw materials for forming the thermoplastic elastomer from 20 parts by mass to 60 parts by mass, and an evaluation was conducted in the same manner as in "Evaluation 1". The evaluation results are shown below.

TABLE 5

| Content (parts by mass) | | Hardness JIS-A | Density g/cm³ | Tensile strength MPa | Elongation % | Tear strength kgf/cm | DIN abrasion mm³ |
|---|---|---|---|---|---|---|---|
| | (a) to (e) | (d1) | | | | | |
| No. 5-0 | (a1): 100 | 0(0) | 70 | 0.89 | 10.5 | 993 | 31.3 | 119.7 |
| No. 5-1 | (b): 100 | 1(0.005) | 70 | 0.89 | 9.7 | 851 | 33.7 | 117.7 |
| No. 5-2 | (c): 2 | 5(0.028) | 70 | 0.89 | 8.4 | 862 | 32.6 | 108.5 |
| No. 5-3 | (e): 60 | 10(0.047) | 70 | 0.90 | 11.0 | 866 | 34.3 | 97.7 |
| No. 5-4 | (f): — | 30(0.140) | 72 | 0.92 | 12.8 | 863 | 39.4 | 80.5 |

* The parentheses in the content of (d) represent the number of moles with respect to 100 parts by mass of the styrene polymer.

From the aforementioned results, it can be seen that a higher amount of the crosslinking aid to be used is advantageous for obtaining a thermoplastic elastomer having excellent abrasion resistance.

Also from the above evaluation results, it can be understood that the thermoplastic elastomer according to this embodiment is suitable as a material of a shoe-forming member.

REFERENCE SIGNS LIST

1: Shoe
2: Upper material
3: Midsole
4: Outer sole
21: Reinforcing sheet material

The invention claimed is:

1. A shoe-forming member comprising a thermoplastic elastomer, the thermoplastic elastomer comprising:
a matrix comprising a polypropylene resin and a poly-α-methylstyrene resin that is a homopolymer of α-methylstyrene; and
a domain comprising a crosslinked elastomer, wherein
the crosslinked elastomer is formed by crosslinking styrene-ethylene-butylene-styrene copolymer resin (SEBS) or styrene-ethylene-ethylene/propylene-styrene copolymer resin (SEEPS), and
the poly-α-methylstyrene resin is contained at a mass ratio of 1.5 times or more of the polypropylene resin.

2. The shoe-forming member according to claim 1, wherein the domain comprising a crosslinked elastomer is covered by the polypropylene resin.

3. The shoe-forming member according to claim 1, wherein
the crosslinked elastomer is formed by crosslinking of a styrene polymer using a crosslinking agent and a crosslinking aid, and
the crosslinking aid is a compound represented by formula (1) below:

$$X^1\text{-}A^1\text{-}R^1\text{-}A^2\text{-}X^2 \tag{1}$$

where "$R^1$" represents an alkylene having a chain length of 2 to 10 carbon atoms or a substituted alkylene represented by formula (2) below in which a hydrogen atom of the alkylene is substituted with a substituent, "$A^1$" and "$A^2$" each independently represent a direct bond or an ether bond, and "$X^1$" and "$X^2$" each independently represent an acryloyl group or a methacryloyl group;

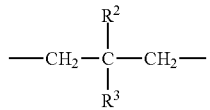

(2)

where "$R^2$" and "$R^3$" represent a hydrogen atom, a hydroxyl group, an alkyl group having 2 to 3 carbon atoms, a (meth)acryloyloxy group, a (meth)acryloyloxymethyl group, or a (meth)acryloyloxyethyl group.

4. A shoe comprising the shoe-forming member according to claim 1.

5. A shoe comprising the shoe-forming member according to claim 2.

6. A shoe comprising the shoe-forming member according to claim 3.

* * * * *